United States Patent [19]

Ketcham

[11] Patent Number: 4,771,838
[45] Date of Patent: Sep. 20, 1988

[54] OBEDIENT SELF-POWERED SLAVE VEHICLES

[76] Inventor: George M. Ketcham, 350 Wilson Rd., Easton, Conn. 06612

[21] Appl. No.: 53,146

[22] Filed: May 21, 1987

[51] Int. Cl.[4] .................. B62D 11/04; B62D 13/00
[52] U.S. Cl. ............................. 180/6.62; 180/14.2
[58] Field of Search ............ 180/14.2, 14.6, 6.64, 180/6.3, 6.62

[56] References Cited

U.S. PATENT DOCUMENTS

| | | | |
|---|---|---|---|
| 3,151,694 | 10/1964 | Rogers | 180/6.64 X |
| 3,362,493 | 1/1968 | Davis | 180/6.3 X |
| 3,578,096 | 5/1971 | Pearson | 180/14.6 |
| 3,783,963 | 1/1974 | Erwin | 180/6.3 |
| 3,830,325 | 8/1974 | Tarter | 180/14.6 |
| 3,865,208 | 2/1975 | Crawshay | 180/6.64 X |

Primary Examiner—John A. Pekar
Attorney, Agent, or Firm—Abelman Frayne Rezac & Schwab

[57] ABSTRACT

An intelligent slave vehicle follows the movements of a master vehicle without imposing a requirement on the master vehicle to supply towing power for the slave vehicle, the slave vehicle being self powered and self controlling in dependence on movements of the master vehicle.

15 Claims, 8 Drawing Sheets

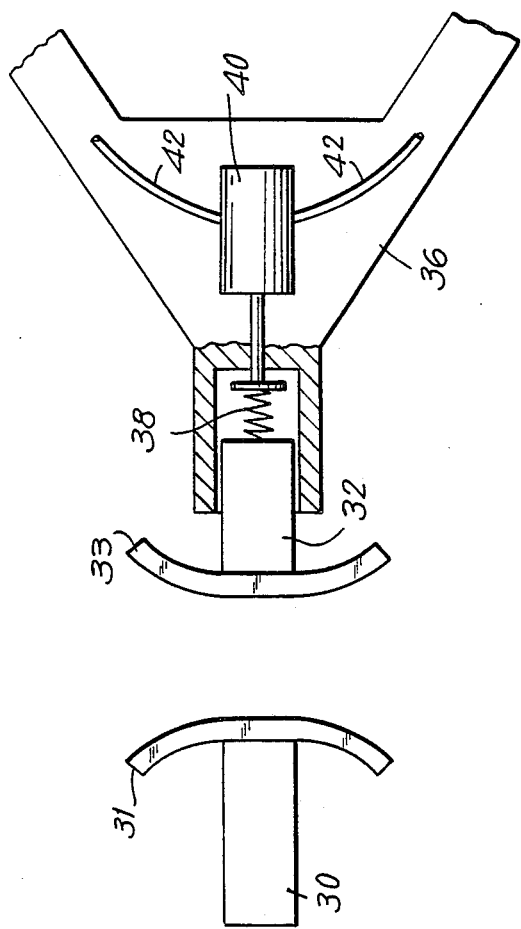
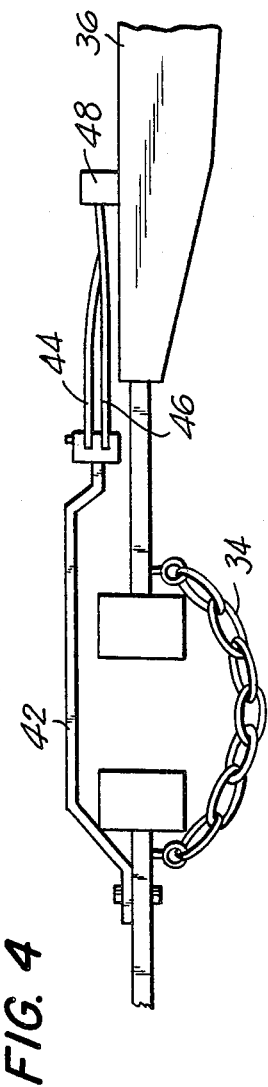
FIG. 3
FIG. 4

4,771,838

OBEDIENT SELF-POWERED SLAVE VEHICLES

FIELD OF THE INVENTION

This invention relates to self-powered trailer vehicles and while not limited thereto, particularly relates to camper trailers and the like which are to be towed by a lead vehicle, usually a passenger automobile.

SUMMARY OF THE INVENTION

The use of camper trailers and the like is limited to those persons who have available a towing vehicle having sufficient excess power output for it to tow an attached trailer without imposing an excessive load on the towing vehicle.

This has precluded the towing of camper trailers by relatively low-powered vehicles, such as compact or sub-compact passenger automobiles, in that such vehicles are relatively low powered and cannot provide adequate excess power for the towing of such trailers.

Even in the event that the towing vehicle does have sufficient excess power to accomodate the towing of a trailer, there still exists the problem of excessive shear loading exerted at the hitch connection between the towing vehicle and the trailer, and there still exists the problem of braking of the trailer, and controlling movements of the trailer such as could cause jack-knifing of the trailer.

The problem of excessive shear loading at the hitch can be relieved and for all practical purposes elimiated by providing a drive, usually a hydraulic drive from the towing vehicle to the supporting wheels of the trailer. However, this can only be done in the event that the towing vehicle has sufficient excess power for it to provide the required motive power for driving the trailer.

Further, unless complex controls are provided which mimic the controls of the towing vehicle, or which are manually controlled by the driver of the towing vehicle, the system can be unstable and unpredictable in operation.

To overcome these problems, it is necessary to provide an umbilical extending between the towing vehicle and the trailer in order to provide the required hydraulic power to the trailer. Also, the umbilical must provide for the required braking of the trailer in dependence on braking of the towing vehicle.

Such umbilicals are objectionable, in that they are subject to damage, and either must be permanently attached to the towing vehicle, with a consequential unsightly appearance of the towing vehicle particularly when it is used alone as a passenger automobile, or, complex and expensive connectors must be provided on the towing vehicle to provide attachment for an umbilical carried by the trailer.

These requirements result in a considerable increase in the weight and complexity of the towing vehicle, this further increasing the power demands on the vehicle when used as a towing vehicle.

Large commercial constructions of towed trailers have been proposed in which a separate internal combustion engine is provided on the trailer and which provides the required motive power to the trailer. In this manner, the towing vehicle is relieved from the requirement to provide excess power for towing the trailer.

However, there still arises the need to provide an umbilical between the towing vehicle and the trailer in order that the driver of the towing vehicle can have control over the internal combustion engine providing the motive power for the trailer, or, in order that the internal combustion engine providing the motive power to the trailer can act as a slave to the engine of the towing vehicle.

Additionally, the need arises to provide a linkage between the brakes of the towing vehicle and those of the trailer, this further increasing the complexity of the umbilical.

SUMMARY OF THE INVENTION

This invention has for its object to provide a self-powered trailer, such as a camper trailer, which can respond as a slave to a towing vehicle such as a compact or sub-compact passenger automobile in the absence of any such power transmitting and control umbilical, thus permitting the use of a compact or subcompact passenger automobile as the towing vehicle with only the attachment of a position indicating member to the passenger automobile.

To provide for the necessary control over the power driven trailer, the passenger automobile is provided with a position indicating member at the rear thereof. The position indicating member is not required to transmit power to the trailer for the purpose of towing the trailer, but merely acts as a control member for the power and braking systems of the trailer. Thus, the position indicating member can be of relatively light weight, and of relatively insubstantial construction as compared with the usual towing hitch for such a trailer.

Control of the trailer is effected by sensing members carried by the trailer and which are acted upon by the position indicating member carried by the towing vehicle, and which in turn act to control the functions of the drive motor and braking system of the trailer.

In this manner, a force of only a few ounces is required to control the movements of a trailer weighing several hundred pounds, without in any way imposing a power demand on the towing vehicle in the towing of the trailer, and, without requiring the usual umbilical interconnecting the towing vehicle and the trailer. Further, the need for a strong and massive hitch interconnecting the towing vehicle and the trailer is reduced to a relatively unobtrusive and insubstantial positioning member.

As the trailer is self-powered, and is self-controlling in dependence on movements of the position indicating member associated with the towing vehicle, and does not impose power demands on the towing vehicle, the towing vehicle itself can be a compact or sub-compact passenger automobile, which otherwise would be considerably under-powered for use in effecting towing of the trailer.

Preferably, the drive of the trailer is effected hydraulically by hydraulic drive motors associated with the respective support and drive wheels of the trailer, the respective drive motors being in hydraulic circuits independent of each other such that they effectively function differentially respective to the right-side and left-side trailer wheels, and also effectively function as brakes for the respective trailer wheels.

In this manner, the trailer is caused to act as a self-powered slave to the towing vehicle, and, to closely follow all changes in conditions of the towing vehicle, whether it be acceleration of the towing vehicle, braking of the towing vehicle, or movements of the towing vehicle during the steering thereof. At the same time, the trailer is controlled against spurious movements, such as over-shooting of the towing vehicle, or jack-knifing relative thereto, the trailer itself being self-steering, and able to duplicate all movement of the towing vehicle.

DESCRIPTION OF THE DRAWINGS

The invention will now be described with reference to the accompanying drawings, which illustrate preferred embodiments thereof, and in which:

FIGS. 3 and 4 illustrate one manner in which a hitch between the towing vehicle and the towed trailer may be constructed.

DISCUSSION OF THE BASIC CONCEPT

Figure 1:
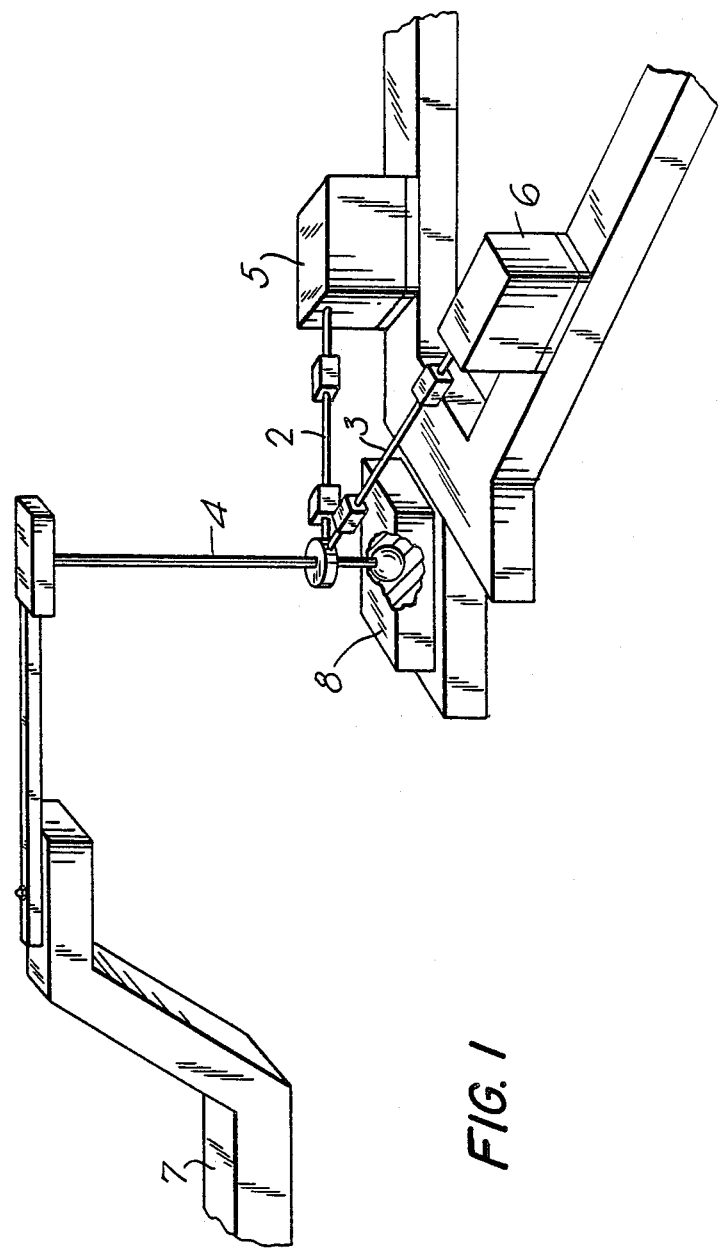
FIGS. 1, 1A and 1B are diagrammatic illustrations of the principal of the present invention.

The key criterion of the concept of the present invention is that an obedient vehicle shall never present any forces upon a master vehicle. This means then that the obedient vehicle must perform in every way so as to follow every motion of the master vehicle without exerting any force upon the master vehicle. To do this there must be some means of detecting what the master vehicle is doing and some means for the obedient vehicle to respond.

The principle of this invention then, is that the obedient vehicle will maneuver as dictated by the detection device and that the detection device will measure the conditions which describes how the master vehicle is performing relative to the obedient vehicle. Although this principle is applicable in all three dimensions and could be implemented for underwater submarines, in air flying machines, and space vehicles, its use herein will be described in relation to the two dimensional plane.

The basic concept will now be described as an example, as related to a travel or camper trailer towed by a passenger vehicle.

Ways of detecting what the towing vehicle is doing are limited only by the imagination. The specific concept of detection for this invention is described later under the heading "The Controller" (electromagnetics, laser beams, strain gages, etc. are other means that the one described herein that could be used to measure the relative condition between the two vehicles).

The specific means for causing the trailer to respond is by the application of differential torque to the support wheels of the trailer. (equal torque for longitudinal response, and unequal torque for lateral response)

When a change in relative displacement between the towing vehicle and trailer is detected, this means that either the towing vehicle has changed its operational state, or, that the trailer has taken an unauthorized action. In either case, this motion is detected and the torque at the respective trailer wheels is changed to accomodate or eliminate the action respectively.

The torque applied to the respective trailer wheels is related to the amount of relative displacement that has occurred between the two vehicles. This wheel torque is made up of two components; that which is required to accelerate the vehicle to a new velocity, and, that required to overcome wind and other resisting friction.

The friction component will be a constant for each constant velocity condition. Friction from the wind, bearing friction, tire friction and all other frictions related to vehicle velocity will require the application of torque at the wheels in order to keep the vehicle moving at the said constant velocity. To generate this torque, there must be a signal provided by the displacement detector.

When the towing vehicle accelerates to a new velocity, the trailer must also accelerate to that new velocity, and, a wheel torque additional to the friction torque must therefore be generated. This torque must be of a value and direction which will cause the trailer to accelerate at the same rate as the towing vehicle, and therefore an additional relative displacment between the two vehicles must be added to that which represents the friction condition.

When the new velocity is achieved, acceleration torque is no longer required and must be eliminated. If the trailer tends to overtake the towing vehicle, the relative displacement between them due to acceleration of the trailer or deceleration of the towing vehicle is reduced until the displacement due only to friction is reached.

In the event that the obedient vehicle should try to take action on its own (such as downhill overriding or responding to side forces from cross winds or the road) this action will be detected by the displacement detector since such action will result in changing the relative displacement between the two vehicles. When the purterbations of the trailer are transient, the system will respond as described for the accelerating condition above since the trailer will be trying to accelerate to a new condition. When the new conditions are steady state (such as a new head wind force) the reaction will be for the friction condition as described above.

The torque that is applied to the trailer's wheels will be of equal amounts for the wheels on both sides of the trailer when the desired action is along the fore and aft centerline, and will be applied unequally to the wheels on either side of the trailer when the desired action is in a direction perpendicular to the vehicle centerline.

Equal wheel torque will cause the trailer to move in a straight line along the longitudinal axis in the direction of travel. An increase in torque will cause the trailer to increase its velocity, while a decrease or reversal in torque will cause the trailer to decrease its velocity without departing from its straight line of travel.

Unequal torque at the wheels will cause the trailer to pivot about the vertical centroid of its wheels, in the same manner that tracked vehicles are steered. This turning motion will cause the front end of the trailer to move in a lateral direction and this will be sensed by the displacement detector.

Response to relative motion between the vehicles in the lateral direction will be the same as that described above for friction and accelerating conditions, except that the torque resulting from this relative motion will be generated differentially at the trailer's wheels so that lateral action will occur.

The Controller

The purpose of the controller is to measure the extent of relative displacement between the towing vehicle and the trailer, and to signal this measurement to the torque producing device.

The controller does not know whether the vehicles are moving or not, it knows only what the displacement between them is and whether this displacement is changing. Furthermore, it must differentiate between longitudinal and lateral displacement.

There are many means of accomplishing these objectives. When longitudinal and lateral motion are measured separately, the results must then be combined so as to cause the equal and unequal torques relating to the relative motion between the vehicles. Most of the methods of measuring the longitudinal and lateral motions separately and simultaneously are complex mechanical, electrical or electronic devices. By the present invention these measurements are made simply and combined automatically.

The principle is to position the measuring devices on the towed vehicle opposite each other and equally displaced from the longitudinal axis of the towed vehicle, and, to connect them both to a single point on the towing vehicle. Then as the towing vehicle (the single point connection) moves along that longitudinal axis the measuring devices will give equal responses to cause the generation of equal torque at the trailer wheels.

When the towing vehicle motion is perpendicular to the longitudinal axis, one of the measuring devices will register an increased relative position, and the other will register a decreased relative position, thus causing the generation of unequal torque at the trailer's wheels.

Since the device responds to relative displacement between the vehicles, the same action occurs when the trailer moves with respect to the tow car.

DESCRIPTION OF THE PREFERRED EMBODIMENTS

Figure 1A:
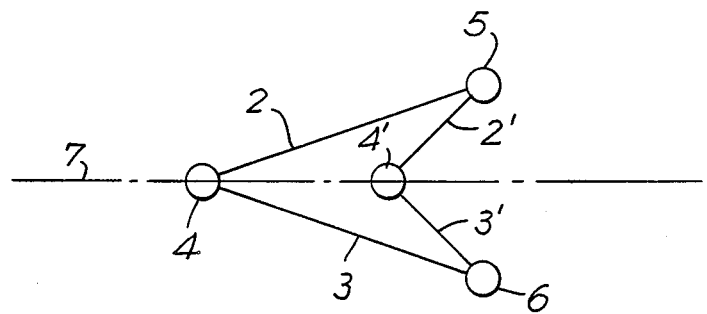
Figure 1B:
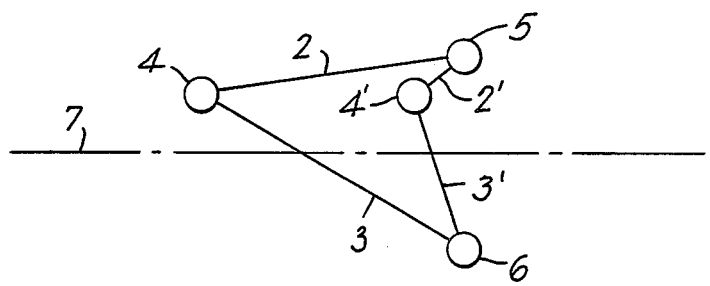

FIGS. 1, 1A and 1B illustrates the manner in which the basic concept of the present invention may be put into practice. The displacement detector is indicated generally at 4 and the displacement sensors are indicated generally at 5 and 6, the respective sensors being connected to the detector 4 by links 2 and 3. The lengths of the links 2 and 3 connecting the displacement detector 4 and sensors 5 and 6 relate the movement of the towing vehicle to the sensors. The sensors 5, 6 measure the amount by which the links 2, 3 are moved by the detector 4, and, in all cases measure the resultant or longitudinal and lateral relative motion between the towing vehicle and the trailer.

Two embodiments of the inventive concept are contemplated. The first as illustrated in FIG. 1 uses hydraulic control valves as the sensors 5 and 6 to sense and convert relative motion into torque. The second, which is described later in detail with respect to FIGS. 3, 4 and 5, uses a push/pull wire to transmit the relative motion to control levers associated with hydraulic pumps. Alternatively, the push/pull wires could be replaced by pairs of hydraulic pistons one at the pump control lever and the other at the measurement location, the pistons being hydraulically connected together such that one will respond in conformity with the motion of the other.

The measurement of both longitudinal and lateral motion will be non-linear with respect to the position of the displacement detector. As is illustrated in FIGS. 1A and 1B, the further the sensors 5 and 6 are spaced from the displacement detector 4, the more linear will be the longitudinal measurement; the reverse being true for lateral measurements. This factor can be used to proportion the longitudinal and lateral reactions by moving the sensors closer to or further from the detector 4, for example by moving the detector 4 closer to the sensors 5 and 6 in the longitudinal direction to the position 4', and correspondingly shortening the links 2 and 3 as indicated at 2' and 3'.

FIGS. 1A and 1B illustrate the manner in which the system is caused to operate. Should, for example, the towing vehicle decelerate, causing the detector 4 to move along the longitudinal axis 7 to the position 4' in FIG. 1A, then, both of the links 2 and 3 will act equally on the respective sensors 5 and 6 to provide a signal to the trailer that it is overspeeding, and, that its velocity must be reduced. At the time the trailer responds to reduce its velocity, then, the detector 4 will move along the longitudinal center line to a position intermediate the locations 4' and 4, at which point the towing vehicle and the trailer will be travelling at the identical linear speeds. Should the trailer attempt to overrun the towing vehicle, then, the sensors 5 and 6 will move closer to the detector 4, this resulting in a signal to the trailer that it should slow even further in order to secure uniformity of linear speed between the towing vehicle and the trailer. If the trailer should decrease its linear speed to an insufficient speed to match that of the towing vehicle, then, the sensors 5 and 6 will move away from the detector 4 to increase the length of the links 2 and 3, and in turn, provide the trailer with a signal indicating that it should accelerate.

Referring now to FIG. 1B, the condition is described in which the towing vehicle is moving to the right, either in normal steering of the towing vehicle, or, in the condition that the towing vehicle is turning a corner. Such movements on the part of the towing vehicle will result in a lateral displacement of the detector 4 relative to the center line 7, which in turn will cause a shortening of the link 2 and a concomitant lengthening of the link 3. This will signal to the trailer that the drive to the right-hand wheels of the trailer should decrease in angular velocity, and, that the wheels at the left-hand side of the trailer should increase in angular velocity, thus driving the trailer on an arcuate path in which the longitudinal center line of the trailer progressively is moved towards the center line 7.

Should the towing vehicle be braking at the time it is making a right-hand turn, then, the detector 4 will move towards the position 4', causing forshortening of the links 2 and 3 by proportionate amounts, illustrated by the links 2' and 3' in FIG. 1B.

Closely similar conditions will arise in the event that the towing vehicle is caused to make a lefthand turn, in which event the link 2 will be lengthened and the link 3 shortened, by reason of the detector 4 moving transversely of the longitudinal center line 7, at which time a condition will be produced in which the link 2 is lengthened and the link 3 shortened, again providing a signal to the trailer that the trailer should execute a left-hand turn.

The Trailer Suspension

A present method of suspending trailers is to locate the load bearing wheels behind the trailer's center of gravity. This then requires the towing vehicle to support a portion of the trailer's weight since the weight of the trailer is not balanced on the wheels.

Suspending the trailer at a position immediately under its center of gravity would eliminate the hitch weight, but this would result in a see-saw action of the trailer as it responded to road irregularities. That motion would then be transmitted to the towing vehicle through the physical connection to the towing vehicle at the hitch.

When the trailer is loaded improperly one of two reactions can occur. If the resultant load adds to the hitch (too much weight in front of the trailer suspension), then the center of gravity of the towing vehicle moves rearward, depressing the rear springs and removing weight from the front wheels making steering of the towing vehicle uncertain. If the resultant load removes weight from the hitch (too much weight behind the trailer suspension), then the trailer tends to see-saw making it difficult for the drive to control the towing vehicle and trailer combination.

Since the addition to the trailer of the weight of a gasoline/diesel engine and the weight of hydraulic system components would have a very significant effect on the trailer, it would be ideal to support these components directly on the suspension itself, since this would not add to the suspended trailer weight. However, there is not sufficient room to add available components. If the components were added to the rear of the trailer, then the suspension would need to be relocated to correspond to the resulting center of gravity. Otherwise a see-saw response would occur. Adding the components at the front of the trailer would possibly overload the towing vehicle, probably more than doubling the previous hitch load.

For these reasons and because an objective of this invention is to isolate the trailer from the towing vehicle so that any size of towing vehicle can be used to tow the trailer, it is a practical consideration to support the front of the trailer with its own suspension.

If the trailer has its own front suspension, that suspension must allow lateral motion of the trailer to occur. Otherwise the wheel or wheels of the front suspension would be pulled sideways as the trailer negotiated turns. Providing the wheels with some amount of caster, and allowing them to swivel through a full 360 degrees will permit this lateral motion.

Any motion in the lateral direction relative to the two vehicles (whether caused by the towing vehicle turning a corner, or, by the trailer responding to cross winds) will be sensed by the displacement sensors which will generate differential restoring torque.

Torque at the drive wheels will always be generated under the direction of the displacement detector to meet the operating requirements as measured by the relative displacement between the two vehicles and therefore the lateral behavior of the trailer will be controlled.

GEOMETRY OF MOTION

Figure 2B:
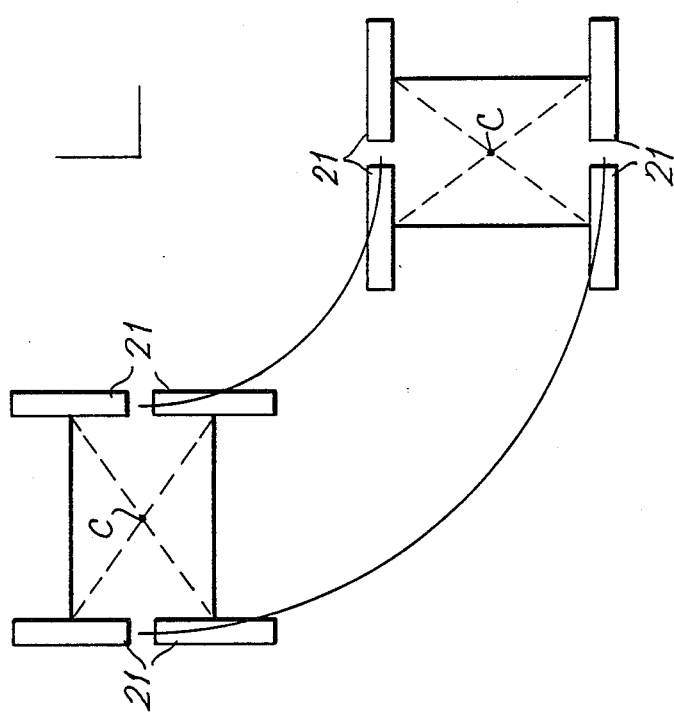
FIGS. 2A and 2B are schematic illustrations of the manner of steering of the trailer.
Figure 2A:
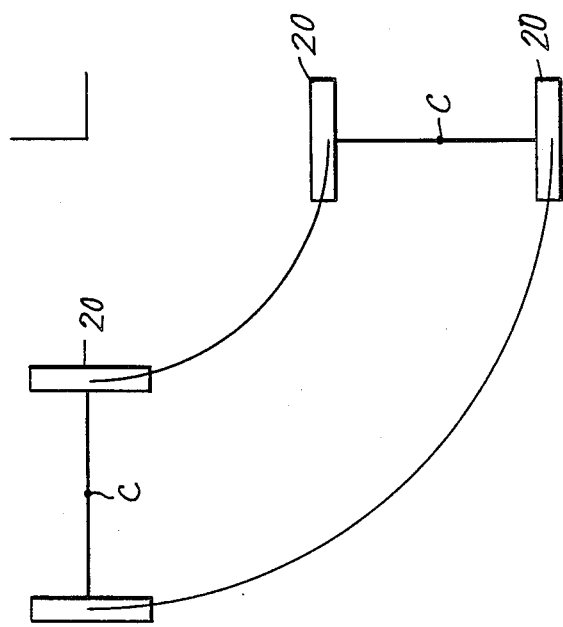

Referring now to FIGS. 2a and 2b, if the trailer is suspended on a single pair of wheels 20, no side forces on the wheels will occur due to turning about their centroid C.

However, when the suspension consists of multiple pairs of wheels 21 21, then side forces and scuffing will occur due to turning about their centroid C. This occurs whether the trailer is physically pulled by a towing vehicle, or whether it is due to differential torque applied to the wheels.

FIG. 2a depicts a single pair of wheels 20 negotiating a right angle turn. The ending position shows that the wheels have rotated 90 degrees about the centroid C of the axle which connects them, and that they have taken different length paths since the axis of rotation is lateral to them. In this case, neither wheel is required to move laterally.

FIG. 2b depicts two interconnected pairs of wheels 21 also negotiating a right angle turn. In this case, the axles connecting the wheels have a fixed relationship and cannot move angularly with respect to each other. As before, the ending position shows that the wheels have rotated 90 degrees from their starting positon and that they have rotated about their common centroid C. In the process, however, each wheel will have experienced side motion and scuffing as it proceeded from its starting to its ending position.

Scuffing will occur on all multiple wheel pairs that are on a fixed non-turning axles of any vehicle when the vehicle executes a turn. This occurs on present day cement trucks, dump trucks, tractor/trailers, and travel trailers that have multiple fixed axles.

Figure 5:
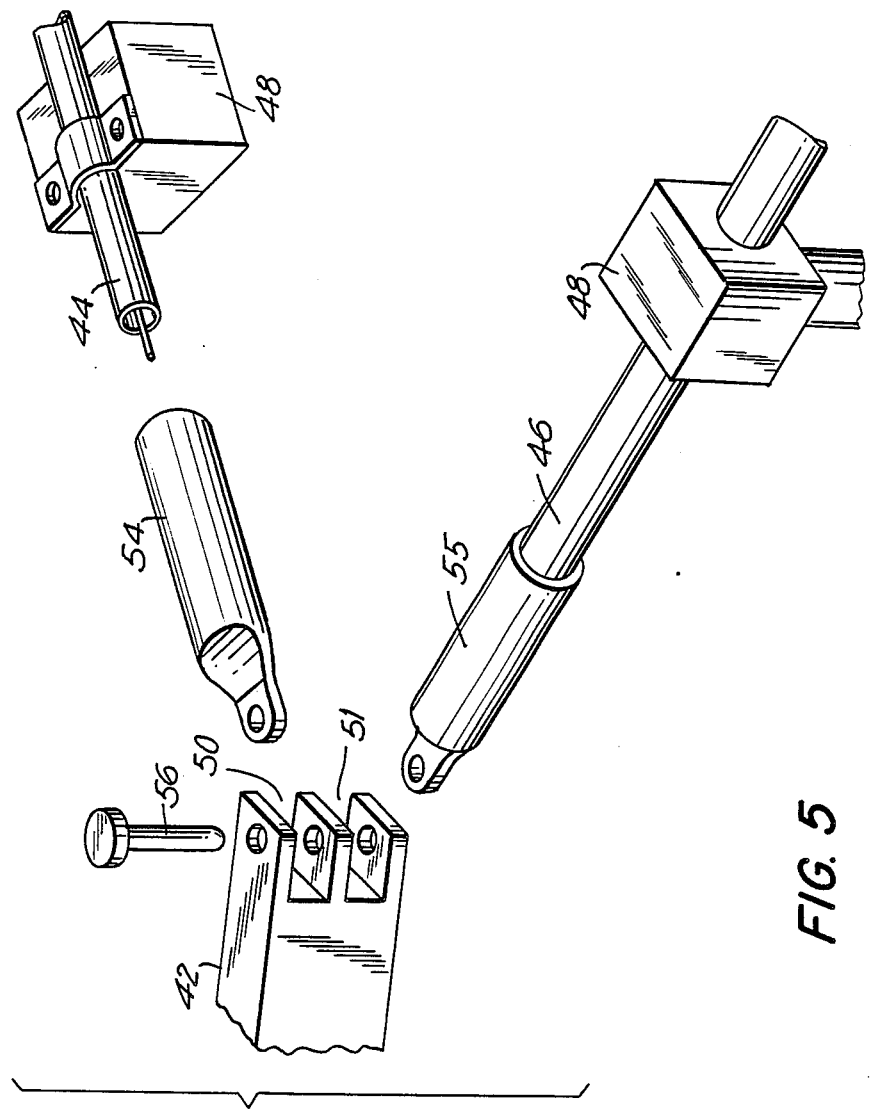
FIG. 5 illustrates an alternative manner in which relative movement between the towing vehicle and the trailer can be sensed.

In the alternative to employing rigid linkages 2 and 3 as previously discussed with respect to FIGS. 1, 1A and 1B, the necessary linkages can be provided by push/pull cables, as now discussed with respect to FIGS. 3, 4 and 5.

Referring firstly to FIG. 3, the car hitch 30, in a similar manner to the arm 7 in FIG. 1 is attached directly to the towing vehicle. The car hitch 30 is loosely attached to the trailer hitch 32 by a freely hanging keeper chain or cable 34, such that the trailer hitch 32 is loosely attached to the car hitch 30, and can move freely relative thereto within the play permitted by the keeper chain.

Optionally, and as illustrated in FIG. 3, the car hitch 30 and the trailer hitch 32 can be provided with a surge braking system depicted herein by bumpers 31 and 33, and, the trailer hitch 32 can be mounted, as is illustrated diagrammatically, for movement relative to the main frame 36 of the trailer. The trailer hitch 32 is biased forwardly by a spring 38, which provides for the translation of longitudinal movements of the trailer hitch 32 to a brake master cylinder 40 mounted on the trailer main frame 36. The brake cylinder 40 is connected by hydraulic lines 42 to operate brakes [not shown] for the respective trailer wheels. Thus, in the event that the trailer should overshoot the towing vehicle by an amount sufficient to cause engagement of the respective bumpers 31 and 33, the brakes of the trailer wheels will be actuated to provide a positive force on the trailer wheels independent of the braking force imposed on those wheels by the drive motor of the trailer and its associated hydraulic circuits, as later specifically described with reference to FIGS. 6, 7 and 8.

Referring now to FIG. 4, the detector 42 of this embodiment is provided by a rigid arm which is rigidly secured to the car hitch 30, and thus, in turn, rigidly secured to the towing vehicle.

At its free end, i.e., the right-hand end in FIG. 4, the detector 42 is connected to the ends of push/pull cables 44, 46, the respective cables being operatively attached to control members controlling the supply of motive power to the wheels of the trailer.

In a manner similar to that described with reference to FIG. 1, the casings of the respective cables are pivotally attached to the main frame 36 of the trailer in a manner permitting angular movement of the respective cables, but inhibiting longitudinal movement of the casing thereof, for example, by their being secured within blocks 48 pivotally mounted on the main frame 36 of the trailer.

FIG. 5 illustrates diagrammatically the manner in which this interconnection can be effected, the detector 42 being illustrated as provided with a bifurcated end defining slots 50, 51, in which cable ends 54 and 55 are pivotally mounted by means of a pin 56. The cable ends 54, 55 are slidable on the casings of the cables 44 and 46, thus providing variable length linkages in exactly the same manner as illustrated in FIG. 1, and which function in exactly the same manner as described with reference to FIGS. 1A and 1B.

Figure 6:
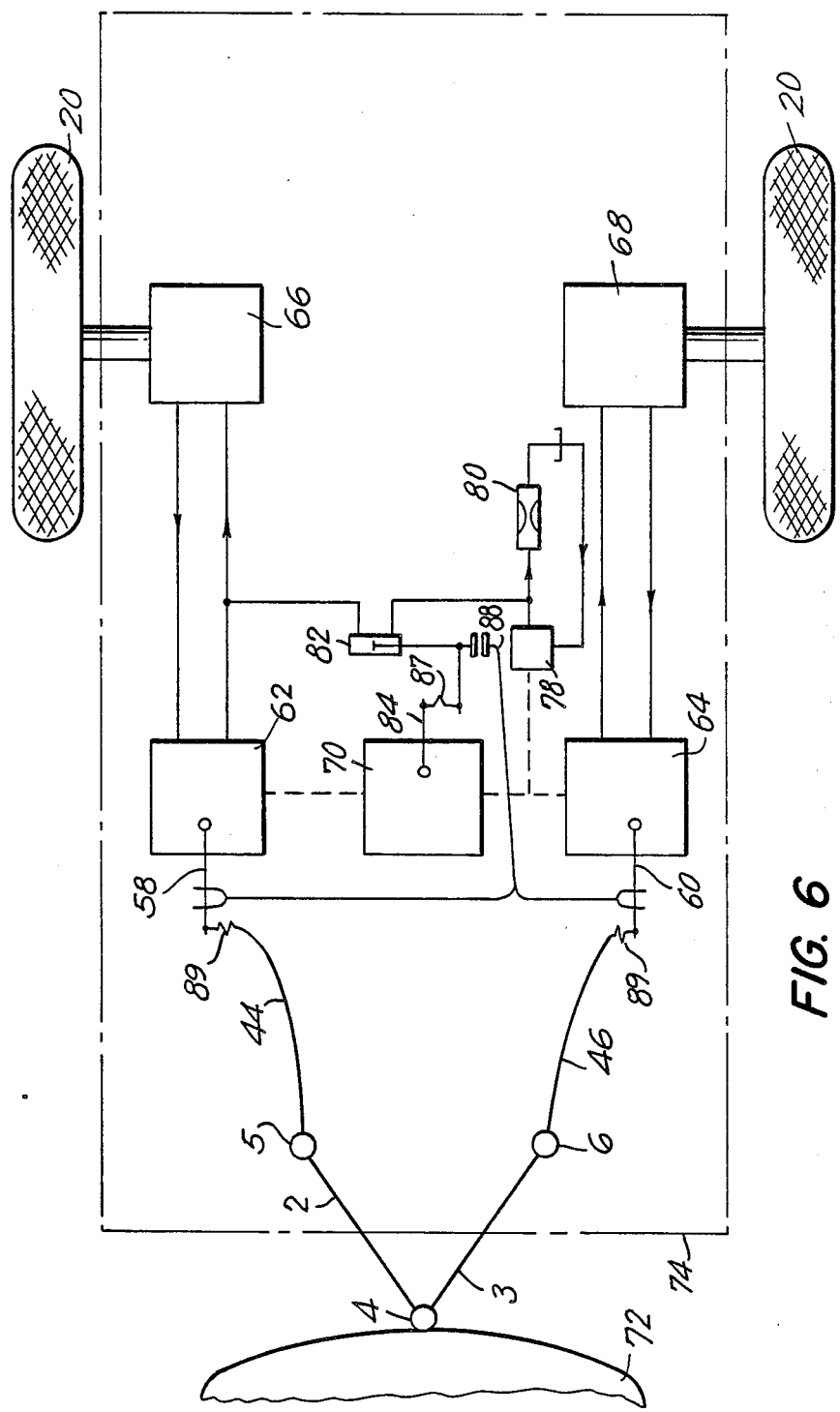
FIGS. 6 and 7 are schematic illustrations of alternative control, power drive and braking systems according to the invention.

FIG. 6 is a line drawing which illustrates an entire trailer power assist system according to one preferred embodiment of the invention. The system includes push/pull cables 44, 46 which operate swash plate control levers 58, 60 of independent left and right wheel hydrostatic transmissions. Each transmission consists of a variable displacement pump 62, 64 and a fixed displacement motor 66, 68. A gasoline or diesel engine 70 is employed to power the pumps 62, 64 and also an engine control subsystem.

The core wires of the push/pull cables 44, 46 are connected together at a single point 4 to the detector 42 and their casings are fastened to the trailer main frame 36 at 48. Therefore, as the relative displacement between the two vehicles changes, the push/pull wires of the cables will move within their respective casings 44, 46. The other ends of the push/pull wires are connected to the pump control levers 58, 60, in order that movement of the wires within their casings will cause movement of the pump control levers. Therefore the positions of the pump control levers 58 and 60 is related to the relative displacement between the towing vehicle 72 and the trailer 74.

Push/pull cable type devices are in wide use where both the push and the pull action is critical to the operation. A common application of such cables is in automobiles where the cables extend between the accelerator pedal and the carburetor. Another common application is between an automatic transmission and the carburetor. Another application is on power boats to control the engagement of the forward and reverse gears and the engine throttle. In each of these applications the cable is depended upon equally for both push and pull operation.

The angles that the push/pull wires 2 and 3 make with their respective casings will depend upon the relative position between the vehicles. In order to assure that each push/pull wire enters its casing 44, 46 always directly in line with the casing, pivoting casing clamps as are provided, as is entirely common in the art.

One end of each casing 44, 46 is clamped in a pivoting clamp 48 so that it cannot move relative to the clamp. The other end of each casing 44, 46 is rigidly clamped in the vicinity of the pump control levers. The initial length of the respective casings 44, 46 between these clamps remains fixed no matter how the casings are bent. Thus, movement of the casings does not cause an axial push/pull movement of the contained push/pull wire. Obviously, gradual and large radius bends are desirable to allow freedom of movement of the push/pull wires within their casings.

The casings 44, 46 extend beyond the pivoting clamps 48 so that the sleeves 54, 55 can slide back and forth along them. The sleeves are connected to the single connection point 4 provided by the pin 56 along with the push/pull wires providing the links 2 and 3. Therefore as the angles between the single connection point 4 and the pivoting clamps 5 and 6 change, the sleeves will keep the casings aligned between them and the motion of the push/pull wires 2 and 3 will be transferred faithfully to the pump control levers 58, 60.

In this embodiment, wheel torque and its control is not generated directly in response to a change in relative displacement between the vehicles. Instead relative displacement is related to velocity, and torque is a consequence of this action. The following paragraphs will describe this in detail in relation to the pump 62, 64 and the associated hydraulic motors 66, 68.

Rotation of the pump will cause slidable pistons within a rotating barrel to rotate about the axis of the pump. The pistons will be sequentially pushed in by the swash plate of the pump and will push oil into the high pressure line. When the swash plate is tilted oppositely, the pistons will push oil into what was previously the inlet line which then becomes the high pressure line and cause reverse rotation of the motor to occur. When the swash plate is in neutral position (not tilted), the pistons are neither pushed or pulled and thus no oil is pushed into either line. A charge pump adds oil to the low pressure line to make up for leakage and oil lost through the relief valves of the pump.

Assume now that a constant speed power source which cannot be stalled is driving the pump. Then starting with the control lever in the neutral position, no oil will flow in either supply line to the motor since the pistons are not moving in their cylinders. As the control lever is moved and the swash plate is tilted, the pump pistons will move and push oil into the pressure line and the motor shaft will turn because the drive motor cannot be stalled and hdraulic oil cannot be compressed. The motor will turn by an amount depending upon the quantity of oil being supplied by the pump which will depend upon the angle of the swash plate.

As a load is applied to the motor shaft, there will be a resistance to turning. But since the flow of oil is unchanged being a function of swash plate angle, and since the motor must pass all the oil that is pumped to it, (there is no place else for it to go) the pressure of the oil must increase to a value which will generate the torque necessary to meet the load requirements. The increased energy will come from the power source.

To reiterate, the drive engine which can supply all the force that may be required, turns the pump shaft with unrelenting force pushing the pistons in their cylinders thus forcing oil into the pressure line. Since hydraulic oil is not compressible, the force exerted on the pistons is transferred undiminished to the hydraulic motors. The motors must turn since the drive engine can supply the necessary force to make them turn.

The force required to turn the motor shaft is related to pressure, thus in this implementation, pressure is a function of the load on the motor shaft. The pump control lever controls quantity of oil flow and thus it equates to speed. Pressure and torque are equivalent quantities. Flow times pressure; speed times torque both equate to horsepower which must be supplied by the power source.

If a large flywheel were mounted to the motor shaft thus giving it an inertial load, then, if the control lever were moved from some velocity position to neutral, the pump pistons will no longer be movable. However, the inertial load will try to keep the motor shaft rotating and the motor will try to pump oil which has no place to go except out through the pressure relief valve. Therefore, in neutral, the motor shaft is locked hydraulically up to the torque associated with the relief valve setting.

Referring now to the system diagram FIG. 6, and starting with the towing vehicle 72 and trailer 74 both at rest on level ground and the engine operating at idle, and, assuming that the driver will accelerate from rest to 40 mph in 20 seconds. Since the control lever on the respective pumps is controlled by the relative displacement of the towing vehicle 72 with respect to the trailer by virtue of the push/pull cable, and since this control lever relates to hydraulic motor rpm, then relative displacement between the vehicles relates to vehicle velocity. In 20 seconds then the relative displacement will change to a position which represents 40 mph and the control lever on the pump will do the same.

Just as soon as there is any movement of the swash plates, pressure will be exerted in the supply lines and the motors will generate enough torque to cause the trailer to move. The speed at which the motors turn is related to the volume of hydraulic oil being supplied to them which is related to the swash plate angle, which in turn is related to the relative position between the vehicles which is steadily increasing so as to reach the 40 mph position in 20 seconds.

When the tow car reaches 40 mph the driver eases up on the accelarator and holds the vehicle at that speed. The trailer reaches 40 mph at the same time. Since the tow car is no longer accelerating, the relative displacement between the vehicles will cease to increase. The volume of hydraulic oil being pumped being related to velocity will remain constant at the 40 mph value. System pressure will drop to the friction value.

Acceleration being the rate of change of velocity, then acceleration is also the rate of change of flow of hydraulic oil since oil flow is related to velocity. Acceleration then is also the rate of change of swash plate angle. When the tow car reaches 40 mph and ceases to accelerate, then the swash plate angle ceases to change and oil flow remains steady at a value equivalent to 40 mph. When the flow no longer tends to increase then the need for pressure to force the motor to accept increased flow is no longer needed and it drops to the friction value and acceleration ceases.

Inertia tries to maintain a free body at its present state and fights any attempt to increase or decrease its velocity in any direction. Since inertia fights acceleration, it cannot cause acceleration. Therefore, when the accelerating force ceases, the trailer cannot overtake the tow car by virtue of inertia force.

When the tow car/trailer is at rest the swash plates are at neutral and system pressure is zero. The pressure output from a tachometer pump 78 operating at idle speed pushes the throttle actuator piston 80 to one end of the cylinder 82 thus keeping the throttle 84 at the engine idle position.

When there is pressure in the system (when output torque is required) the throttle actuator piston will move away from the idle position against the tachometer pressure, thus opening the throttle and causing the engine to increase its power output. Throttle motion will continue until the engine power output causes the engine to accelerate. The engine 70 will continue to accelerate until an rmp is reached at which the tachometer pressure equals the system pressure, at which point no further throttle motion will occur.

The tachometer pump pushes oil through a fixed orifice 80 to a return line 86. The tachometer pump output volume is related to its shaft speed (which is engine speed) and since the oil must pass through the orifice 80, then the tachometer pump pressure is also related to pump speed (engine speed). As the tachometer pump speed increases, pressure at the output thereof must also increase in order to push the increasing volume of oil through the orifice 80. Therefore as the engine accelerates, tachometer pressure increases to the point that it balances system pressure on the throttle actuator piston, and, the throttle will be moved to a position which satisfies the required power input (pressure times volume; speed times torque).

System pressure is related to torque at the wheels. Tachometer pressure is related to engine speed. As the two pressures meet at the throttle actuator, the throttle position (actuator piston positon) will adjust until engine speed is the equivalent of system pressure (tachometer pressure equals system pressure). Therefore engine speed is related to wheel torque and throttle position is related to power.

As has been previously discussed, two torque components are required; steady friction torque related to speed, and, transient acceleration torque. Acceleration torque occurs only to cause a velocity change. If, for example, an acceleration of 2 mph per second is required to reach 40 mph in 20 seconds, as the towing vehicle velocity increase, a corresponding increase in swash plate angle will occur. Wheel torque will remain constant since the acceleration force remains cosntant (equivalent to 2 mph/second). However, the increase in oil flow (increase in hydraulic motor rpm corresponding to increased vehicle velocity) at constant pressure indicates an increase in horsepower requirement. Increasing required power will tend to slow the drive engine, which will tend to reduce tachometer pressure, which will cause system pressure in the throttle actuator to move the piston and thereby the throttle resulting in an increase in throttle position to correspond to the required power increase. Engine rpm will remain constant at the equivalent of the constant system pressure (acceleration force) while the throttle position will change to correspond to required increasing power.

As vehicle velocity increases, a point will occur when the engine throttle will be at its maximum position and no further increase in horsepower will be available without an increase in engine rpm. At this point there are several rationals:

a. There will be a specific vehicle velocity at which maximum throttle will occur for each value of acceleration (system pressure). These terminal velocity and acceleration relationships define an operating envelope. When desired operation remains within this envelope boundary, then the boudnary is not limiting.

b. When operation beyond the envelope boundary is attempted, the tow car will be accelerating to a velocity higher than the capability of the trailer. The swash plate angle will tend to continue to increase, system pressure will tend to rise and the throttle actuator will advance. Since the engine throttle is connected to the actuator by a spring 87, movement beyond its maximum position is permitted. Continued movement of the throttle actuator engages the push/pull cables 88 which push (or hold) the pump control arms 58 to the positions related to the maximum engine output. The push/pull cables 88 are connected to the pump control arms by springs 89, thus allowing the tow car to continue until it reaches the hitch limit. At this point the tow car will begin to exert a pull on the trailer and further action will depend upon the driver. Continued acceleration will depend upon how much power the tow car can add to the tow car/trailer combination.

c. At any point within the envelope boundary the operating status of the tow car can be changed since the throttle will not be at its maximum position. The velocity can be increased or decreased or the rate of acceleration can be changed. Each new condition will have its related torque (system pressure). When the boundary is reached, the driver can change to a higher operating status by decelerating and then re-accelerating. This will force the engine throttle below the maximum position and then allow the establishment of a new set of operating parameters.

Figure 7:
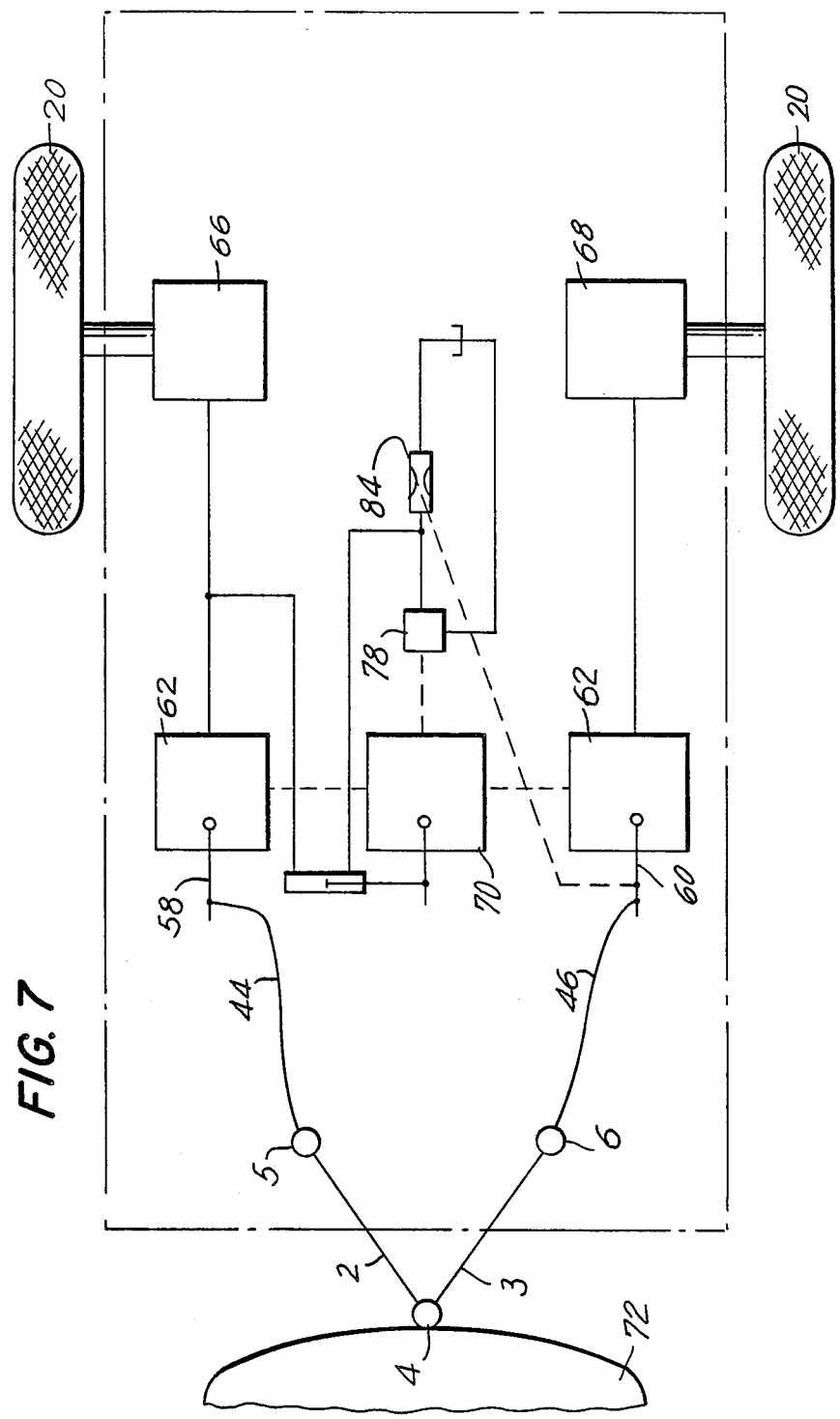

FIG. 7 shows an alternate system configuration which requires a somewhat more complex control component. In this configuration, the tachometer orifice 84 is varied as a function of swash plate angle. As the swash plate angle increases, the orifice size increases, which changes the engine speed/system pressure relationship resulting in a higher engine speed with increasing horsepower requirements. Engine intake manifold vacuum is another parameter that relates to horsepower and may be used to control the variable orifice.

In summary, there are three levels of sophistication of system control. In the lowest level, the user must stay within the operating envelope boundary in order to prevent stalling the engine. The next higher level limits swash plate angle at maximum throttle position. In both of these levels the user can shift to higher operating conditions by decelerating and then re-accelerating. The variable tachometer orifice makes system control automatic.

Various modifications of the system control and system discussed above can be effected without departing from the scope of this invention.

Figure 8:
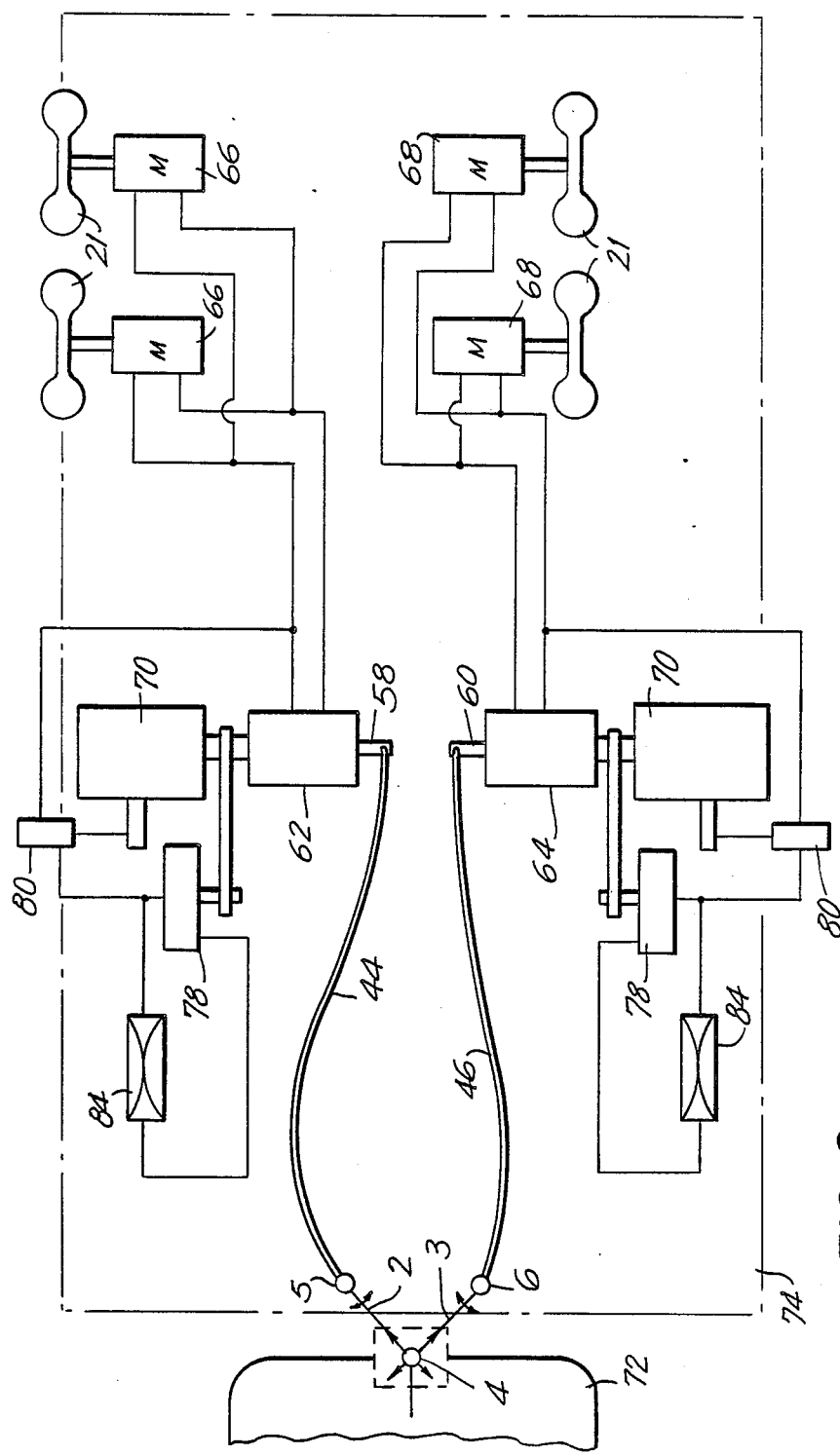
FIG. 8 is a similar schematic illustration of an alternative embodiment of the sensing, drive and braking components of the invention.

For example, and as illustrated in FIG. 8, the system control can be adapted to a trailer having four support wheels 21, each of which is to be driven.

In FIG. 8 the same reference numerals have been used to identify those components having an identity with the system controls of FIGS. 6 and 7. In FIG. 8, dual engines 70 are provided, each driving a swash plate pump 62, 64, the outputs of the respective pumps being connected to dual drive motors 66, 66 and 68, 68, the drive motors being arranged in parallel in the hydraulic circuit.

Various other inter-relationships of structures are possible in order to accomplish the basic concept of the present invention, that concept embodying feedback control through the measurement of relative displacement in order to control the application of power to the drive wheels in a differential manner, so as to control movements of the trailer in both longitudinal and lateral dimensions, or, if appropriate, in other directions, as falling within the scope of the appended claims.

I claim:

1. An obedient self-powered and self-controlling slave vehicle, comprising:
    a body of said slave vehicle having a suspension and at least two ground engaging wheels;
    a power supply mounted on said slave vehicle body;
    separate independent drives to the respective said ground engaging wheels from said power supply;
    controllable variable torque transmitting means interposed in each said independent drive and driven by said power supply;
    actuator means fixably attached to said master vehicle and movable omni-directionally in unison therewith; and,
    control means carried by said slave vehicle and controlling said variable torque transmitting means, said control means being operatively associated with said actuator means and actuated by said actuator means for it to follow the omnidirectional movement of said actuator means, and thus movement of said master vehicle, in dependence on translational movements of said actuator means relative to a reference point on said slave vehicle, to provide for selective steering, acceleration and braking up of said slave vehicle duplicating movements of said master vehicle in the absence of a physical interconnection between said vehicles.

2. The vehicle of claim 1, in which said slave vehicle is a trailer and said master vehicle is an automobile preceeding said slave vehicle.

3. The vehicle according to claim 1, including a position indicating member mounted on said master vehicle, and control members of said control means operatively associated with said position indicating member for them to be moved by said position indicating member in direct relationship with movements of said master vehicle.

4. The vehicle of claim 3, in which said control members are axially movable members operatively connected to said respective control means, and said control members are each operative to exercise individual control of torque transmission to the respective individual wheels of said slave vehicle.

5. The vehicle of claim 4, in which said control members are rods operatively connected to operate said control means, and which are positionally moved by said position indicating member of said master vehicle.

6. The vehicle of claim 4, in which said control members are push/pull cables operatively connected to operate said control means, and which are operated by said position indicating member of said master vehicle in dependence on movements of said position indicating member.

7. The vehicle of claim 1, in which said power supply is connected to drive a single hydraulic pump, and said control means comprises independent hydraulic control valves interposed respectively in hydraulic supply lines from said hydraulic pump to independent hydraulic drive motors respectively connected to drive an associated one of said ground engaging wheels.

8. The vehicle of claim 7, in which said control means controls brakes for the associated hydraulic drive motor to prevent overspeeding of a said hydraulic drive motor and in turn apply a braking force to the associated wheel in the event of overspeeding of the associated ground wheel.

9. The vehicle of claim 7, including means for varying the power output of said engine and for varying the volumetric output of said pump in dependence on a sensed power requirement of said slave vehicle.

10. The vehicle of claim 1, in which said internal combustion engine is connected to drive plural hydraulic pumps respectively associated with hydraulic drive motors, respectively connected to drive an associated one of said ground engaging wheels.

11. The vehicle of claim 10, in which said respective hydraulic pumps provide brakes for the associated hydraulic drive motors to prevent overspeeding of said hydraulic drive motors in the event of overspeeding of the associated ground wheels.

12. The vehicle of claim 10, including means for varying the power output of said prime mover and for varying the volumetric output of said pumps in dependence on a sensed power requirement of said slave vehicle.

13. The vehicle of claim 10, in which said slave vehicle is a trailer vehicle, and said master vehicle is a similar trailer vehicle operating under the control of a master vehicle in order to provide a train of said vehicles, each of which is independently self-powered and self-controlling.

14. A self-poewred and self-controlling vehicle comprising:
   a body comprising a slave vehicle having a suspension and at least two ground engaging wheels;
   power supply means comprising at least one power supply mounted on said slave vehicle body;
   separate independent drives to the respective said ground engaging wheels from said power supply means;
   controllable variable torque transmitting means interposed in each said independent drive;
   an actuator means fixidly attached to a master vehicle and movable omni-directionally in unison therewith; and,
   control means carried by said slave vehicle and controlling said variable torque transmitting means, said control means being operatively associated with said actuator means and actuated by said actuator means for it to follow the omnidirectional movement of said actuator means, and thus movement of said master vehicle, in dependence on translational movements of said actuator means relative to a reference point on said slave vehicle, to provide for selective steering, acceleration and braking of said slave vehicle duplicating movements of said master vehicle in the absence of a physical interconnection between said vehicles.

15. An obedient self-powered and self-controlling vehicle, comprising:
   a body providing a slave vehicle having a suspension and at least two ground engaging wheels;
   a power supply mounted on a master vehicle;
   power transmitting means between the power supply on the master vehicle and the slave vehicle;
   separate independent drives to the respective said ground engaging wheels;
   controllable variable torque transmitting means interposed in each said independent drive and powered by said power supply and power transmitting means; and,
   control means carried by said slave vehicle and controlling said controllable variable torque transmitting means in dependence on translational movements of a reference point of a master vehicle with which said slave vehicle is associated.

* * * * *